3,130,147
ZIRCONIUM - ALUMINUM - PHOSPHORUS CATALYST AND METHOD FOR PREPARING THE SAME, EMPLOYED FOR THE CRACKING OF HYDROCARBONS
Francis G. Dwyer, Delaware Township, Camden County, and Sylvander C. Eastwood, Woodbury, N.J., assignors to Socony Mobil Oil Company, Inc., a corporation of New York
No Drawing. Filed Sept. 18, 1961, Ser. No. 138,563
7 Claims. (Cl. 208—114)

This invention relates to an acidic catalytic composite and to a method for manufacture thereof. More particularly, the present invention is directed to an acidic catalyst consisting essentially of an oxygen-containing combination of aluminum, zirconium and phosphorus and to a method for preparing said catalyst.

It has heretofore been known to prepare catalytic composites of alumina and zirconia. Such composites have been produced, for example, by reacting a solution of an aluminum salt and an alkali metal zirconium carbonate. It has also been known to prepare metal phosphate catalysts, particularly applicable for use in polymerization reactions, by treating suitable porous adsorbent materials with phosphoric acid.

The present invention is directed to a new acidic catalyst useful in hydrocarbon conversion processes utilizing an acid-acting catalyst, such as isomerization, polymerization, alkylation and cracking. Also, the catalyst described herein may effectively serve as the acidic component of a dual-function catalyst comprising an acid acting component and a dehydrogenation component. Such latter type catalysts are useful in hydrocarbon conversion operations such as hydrocracking and reforming.

In one embodiment, the present invention provides for a process for the manufacture of an acidic catalyst by reacting, in aqueous solution, a water-soluble aluminum compound, a water-soluble zirconium compound and a water-soluble oxyacid of phosphorus or salt thereof to yield an acidic hydrosol in which the atomic ratio of aluminum to zirconium is between about 0.1 and about 10 in which the atomic ratio of the combined content of aluminum and zirconium to phosphorus is between about 0.1 and about 10, permitting the resulting hydrosol to set to a hydrogel, aging the hydrogel in an aqueous solution of an alkali metal or ammonium salt of an acid characterized by a dissociation constant of less than about $1.7 \times 10^{-2}$, washing the aged hydrogel free of water-soluble matter and drying the washed hydrogel.

In another embodiment, the invention provides for an acidic catalyst consisting essentially of an oxygen-containing combination of aluminum, zirconium and phosphorus prepared by the foregoing method.

In still another embodiment, the invention comprises an acidic catalyst consisting essentially of an oxygen-containing combination of aluminum, zirconium and phosphorus wherein the atomic ratio of aluminum to zirconium is between about 0.1 and about 10 and in which the atomic ratio of the combined aluminum and zirconium content to phosphorus is between about 0.1 and about 10.

In yet another embodiment, the invention provides for a dual function catalyst wherein the above acidic component is intimately combined with a dehydrogenation component, comprising a heavy metal constituent, for example, metals or compounds of metals of groups V through VIII of the periodic table.

The catalyst described herein is thus applicable for use in numerous hydrocarbon conversion reactions. The catalyst may be employed by itself, for example, in effecting isomerization, polymerization, alkylation and cracking or may, in combination with a dehydrogenation component as described above, be employed for reforming or hydrocracking operations. Another reaction employing a catalyst of the above dual-function type is a desulfurization reaction in which hydrocarbon fractions containing combined sulfur are subjected to mild hydrogenating conditions in the presence of an acidic catalyst to effect the hydrogenation and desulfurization of molecules to produce hydrogen sulfide and the corresponding hydrocarbon. The dual-function type catalyst may be prepared by intimately combining the acidic composite described herein with a dehydrogenation component comprising a heavy metal of groups V through VII of the periodic table or a compound thereof. Examples of suitable metals for such purpose are platinum, palladium, nickel, cobalt, iron, manganese, chromium, molybdenum, tungsten, vanadium and copper. Certain combinations of these metals produce synergistic effects such as combinations of cobalt and molybdenum, nickel and tungsten, and chromium and copper.

One of the principal objects of the present invention is the provision of an acidic catalyst consisting essentially of any oxygen-containing combination of aluminum, zirconium, and phosphorus. Another object is to afford a method for producing hydrosols of such composition characterized by a short gelation time. A still further object is the provision of a process for manufacturing cogels consisting essentially of an oxygen-containing combination of aluminum, zirconium, and phosphorus by forming a hydrogel of such composition which, after aging, may be washed free of water-soluble matter and dried to form a porous adsorbent catalytic product.

The above and other objects which will be apparent to those skilled in the art are achieved in accordance with the present invention wherein composites consisting essentially of an oxygen-containing combination of aluminum, zirconium and phosphorus are prepared by reacting, in aqueous solution, a water-soluble salt of zirconium, a water-soluble salt of aluminum, and a water-soluble oxyacid of phosphorus or salt of such acid to yield a sol which sets to an all-embracing hydrogel in which the atomic ratio of aluminum to zirconium is between about 0.1 and about 10, and in which the atomic ratio of the combined content of aluminum and zirconium to phosphorus is between about 0.1 and about 10. The hydrogel so obtained, is thereafter aged in a solution of a weak acid ammonium or alkali metal salt and subsequently contacted with such aqueous treating solutions as are desired for density control, base-exchange, impregnation or the like; water-washed free of soluble matter and dried. The resulting product is thereafter calcined generally at a temperature between about 800° F. and about 1400° F.

Hydrogels prepared by the process described herein are generally characterized by a gelation time of not more than 2 hours although it is to be realized that hydrogels having a longer time of set when desired may also be produced by the present method. The method of this invention is particularly adaptable for the production of hydrogels characterized by a time of set of less than about 20 seconds which hydrogels are capable of being formed into spheroidal particles upon introducing the hydrosol in the form of globules into a water-immiscible medium and maintaining the hydrosol globules in the medium until they set to globules of hydrogel.

The essential compounds required for forming inorganic oxygen-containing cogels of aluminum, zirconium and phosphorus in accordance with the present process include a water-soluble aluminum salt, a water-soluble zirconium salt and a water soluble oxyacid of phosphorus or a salt thereof. These compounds may be intimately mixed, in aqueous solution, in any desired manner to yield a resulting hydrosol. The solutions may be contacted by flowing streams thereof together under conditions of rapid flow such as in a mixing nozzle. Additional components may, if so desired, be introduced at this stage by dissolving a suitable compound of the desired component in one of the hydrosol forming solutions or by mixing a stream of a compound of such desired component with the streams of the reactants. The water-soluble aluminum salt employed may include any of the readily available water-soluble salts of this metal and, particularly, the salts of mineral acids such as the sulfate, chloride and nitrate. Likewise, the water-soluble zirconium salt employed may include any of the readily available zirconium salts such as zirconium tetrachloride, zirconium tetraiodide, zirconium sulfate, zirconyl bromide, zirconyl chloride, and zirconyl iodide. The water-soluble oxyacid of phosphorus or salt thereof may include, by way of example, orthophosphoric acid, pyrophosphoric acid, and metaphosphoric acid, phosphorus acid and hypophosphorus acid and salts of said acids, particularly, the alkali metal and ammonium salts which may be monobasic, dibasic or tribasic salts of the specified acids including, for example, sodium tripolyphosphate and sodium hexametaphosphate.

The quantity and concentration of the reactant solutions employed is, in accordance with the invention, controlled to afford a resulting gel product in which the atomic ratio of aluminum to zirconium is within the range of 0.1 to 10, and in which the atomic ratio of combined aluminum and zirconium, i.e. total metals content, to phosphorus is within the approximate range of 0.1 to 10.

The hydrosols prepared in accordance with the present process may be allowed to set to an all-embracing hydrogel in the form of a mass which is thereafter broken up or cut up into particles for wet processing. An alternate method of preparing the hydrogel particles is to drop the hydrosol in the form of globules into a body of water-immiscible liquid so that spheroidal bead-like particles of hydrogel are formed upon gelation of the hydrosol globules while maintained in the liquid.

The hydrogel particles so obtained are thereafter aged for a period of between about 1 and about 48 hours at a temperature within the approximate range of 120 to 212° F. in an aqueous solution of an alkali metal or ammonium salt of an acid having a dissociation constant of less than about $1.7 \times 10^{-2}$. Typical of such salts are the ammonium and alkali metal salts of acetic, formic, sulfurous and other weak organic and inorganic acids. The aging treatment serves to raise the pH of the hydrogel and set the structure to the cogel. After aging, the hydrogel particles are water-washed free of soluble matter. A particularly preferred method for washing the hydrogel is by percolation either with upward or downward flow of water. After washing, the hydrogel particles are dried at a temperature generally from about 150 to about 350° F. for 2 to 24 hours or more or dried at such temperature and then calcined at a temperature of from about 350 to about 1400° F. for about 2 to 12 hours or more. Usually, it is preferred to dry the hydrogel particles in air or an atmosphere of superheated steam at a slow rate since such manner of operation has been found to result in less breakage of the gel particles. Calcining is ordinarily carried out in air and generally at a temperature between about 800° F. and about 1400° F. although other inert atmospheres may, likewise, be used. If desired, the hydrogel particles may be treated with catalytic components prior to the drying or drying and calcination operations and the composite so obtained may then be subjected to the above-described drying and calcination.

The oxygen-containing cogels of aluminum, zirconium and phosphorus produced in accordance with the process of this invention may be used as treating, refining, purifying agents or as a catalyst, catalyst support or component of a catalyst for the conversion or organic compounds. The present composites have been found to be particularly useful as acidic catalysts in promoting acid catalyzed reactions such as cracking, isomerization, polymerization, and alkylation when used alone. The catalyst described herein may also be used as one component of a dual-function catalyst wherein it is present as an acidic component and intimately combined either by suitable mechanical admixture or by impregnation with a dehydrogenation component as described hereinabove.

The following examples will serve to illustrate the catalyst of the invention, its method of preparation and its use in hydrocarbon conversion.

Example 1

A hydrosol was prepared by mixing 6629 grams of an aqueous solution containing 128 grams of $Al_2O_3$ as $Al_2(SO_4)_3$ and 622 grams $ZrO_2$ as $Zr(SO_4)_2 \cdot 4H_2O$ with 3870 grams of a solution containing 1158 grams of sodium hexametaphosphate. The resulting sol set to a firm, all-embracing hydrogel having a pH of less than 1 in about 10 minutes. The hydrogel was broken up into cubes and aged in a 10 percent weight aqueous solution of ammonium acetate for 16 hours at 160° F. After aging, the gel was water-washed for 24 hours to remove soluble salts and thereafter dried in superheated steam at 250° F. and finally calcined in air at 900° F. for 3 hours.

The gel catalyst, so prepared had a surface area of 230 m.²/g. and contained aluminum and zirconium in an atomic ratio of 1:2 and an atomic ratio of total metals (combined aluminum and zirconium) content to phosphorus of 1:1.5.

The above catalyst was evaluated for isomerization activity by passing a mixture of cyclohexene and hydrogen (10 parts of hydrogen to 1 part of cyclohexene) over the catalyst at 600° F. and atmospheric pressure, employing a liquid hourly space velocity of 1.4. A conversion of cyclohexene to methyl cyclopentene isomers in the amount of 68% by weight was achieved.

The catalyst was also evaluated for cracking activity employing as charge a Mid-Continent gas oil having a boiling range of 450 to 950° F., a temperature of 875° F., a liquid hourly space velocity of 1.5 and a catalyst to oil ratio of 4.0. The catalyst afforded a conversion of 59.4% volume. The catalytic advantage of this catalyst is evident from a comparison of results obtained under identical cracking conditions with alumina-zirconia, and zirconium phosphate catalysts. A comparison of such results is set forth below:

| Catalyst | Percent Volume Conversion |
| --- | --- |
| 11.25% wt. $Al_2O_3$—54.5% wt. $ZrO_2$—34.25% wt. P | 59.4 |
| 85% $Al_2O_3$—15% $ZrO_2$ | 17.7 |
| 15% $Al_2O_3$—85% $ZrO_2$ | 27.9 |
| Zirconium phosphate | 25.2 |

It is evident from the above data that the catalyst described herein afforded a marked advantage in catalytic cracking over previously known alumina-zirconia, and zirconium phosphate catalysts.

Example 2

A hydrosol was prepared by mixing 1700.8 grams of an aqueous solution containing 34.4 grams of $Al_2O_3$ as $Al_2(SO_4)_3$ and 165.6 grams of $ZrO_2$ as $Zr(SO_4)_2 \cdot 4H_2O$ with 685.5 grams of a solution containing 205.5 grams of sodium hexametaphosphate. The resulting sol set to a firm hydrogel having a pH of about 1 in about 10 minutes. The hydrogel was then split into four equal parts and aged separately in solutions of ammonium acetate, ammonium sulfite, sodium acetate and ammonium formate for 16 hours at 200° F. After aging, the gel samples were washed free of soluble salts, dried in air at 250° F. and finally calcined in air at 900° F. for three hours.

The gels so prepared contained aluminum and zirconium in an atomic ratio of 1:2 and an atomic ratio of total metals content to phosphorus of 1:1.5.

The above catalysts were evaluated for cracking activity by passing n-decane over the catalyst at 900° F. and atmospheric pressure, employing a liquid hourly space velocity of 1.0. The catalysts were also evaluated for cracking activity by passing methyl cyclohexane over the catalyst at 900° F. and atmospheric pressure, employing a liquid hourly space velocity of 1.0. The results of these evaluations determined by the extent of conversion to cracked products from a sample of products taken 3 minutes after introduction of the charge into the reactor are shown below:

| Aging Solution | 3 M Ammonium Acetate | 3 M Ammonium Sulfite | 3 M Sodium Acetate | 3 M Ammonium Formate |
|---|---|---|---|---|
| n-Decane Cracking—Conversion, percent wt. | 28.7 | 37.5 | 31.6 | 38.9 |
| Methylcyclohexane Cracking—Conversion, Percent wt. | 8.7 | 19.7 | 21.7 | 28.1 |

A composite prepared in the same manner as the above catalysts but with omission of the aging step afforded a material of low surface area and negligible catalytic activity, establishing the essential and beneficial effect of the aging step in the process described herein.

It will be understood that the above description is merely illustrative of preferred embodiments of this invention of which many variations may be made within the scope of the following claims by those skilled in the art without departing from the spirit thereof.

We claim:
1. A process for the manufacture of an acidic catalyst which comprises reacting, in aqueous solution, a water-soluble salt of aluminum, a water-soluble salt of zirconium and a water-soluble compound selected from the group consisting of oxyacids of phosphorus and salts of said acids in concentrations and quantities to yield an acidic hydrosol in which the atomic ratio of aluminum to zirconium is between about 0.1 and about 10 and the atomic ratio of combined aluminum and zirconium content to phosphorus is between about 0.1 and about 10, permitting said hydrosol to set to a hydrogel, aging the hydrogel for a period of between about 1 and about 48 hours at a temperature within the approximate range of 120 to 212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter and drying the washed hydrogel.

2. A process for the manufacture of an acidic catalyst which comprises reacting, in aqueous solution, a water-soluble aluminum salt, a water-soluble zirconium salt and a water-soluble compound selected from the group consisting of oxyacids of phosphorus and salts of said acids in concentrations and quantities to yield a hydrosol capable of setting to a hydrogel in not more than two hours and in which the atomic ratio of aluminum to zirconium is between about 0.1 and about 10 and the atomic ratio of combined aluminum and zirconium content to phosphorus is between about 0.1 and about 10, permitting said hydrosol to set to a hydrogel, aging the hydrogel for a period of between about 1 and about 48 hours at a temperature within the approximate range of 120 to 212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter, drying and calcining the dried gel.

3. A process for the manufacture of an acidic catalyst which comprises reacting, in aqueous solution, a water-soluble aluminum salt of a mineral acid, a water-soluble zirconium salt of a mineral acid and an alkali metal phosphate to yield a hydrosol in which the atomic ratio of aluminum to zirconium is between about 0.1 and about 10 and the atomic ratio of combined aluminum and zirconium to phosphorus is between about 0.1 and about 10, permitting said hydrosol to set to a hydrogel, aging the resulting hydrogel for a period of between about 1 and about 48 hours at a temperature within the approximate range of 120 to 212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter and drying the washed hydrogel.

4. A process for the manufacture of an acidic catalyst which comprises reacting, in aqueous solution, aluminum sulfate, zirconium sulfate and sodium hexametaphosphate to yield a hydrosol in which the atomic ratio of aluminum to zirconium is between about 0.1 and about 10 and the atomic ratio of combined aluminum and zirconium to phosphorus is between about 0.1 and about 10, permitting said hydrosol to set to a hydrogel, aging the resulting hydrogel for a period of between about 1 and about 48 hours at a temperature within the approximate range of 120 to 212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter, drying and calcining the dried gel.

5. An acidic catalyst consisting essentially of an oxygen-containing combination of aluminum, zirconium and phosphorus wherein the atomic ratio of aluminum to zirconium is between about 0.1 and about 10 and in which the atomic ratio of the combined aluminum and zirconium content to phosphorus is between about 0.1 and about 10, prepared by reacting, in aqueous solution, a water-soluble salt of aluminum, a water-soluble salt of zirconium and a water-soluble compound selected from the group consisting of oxyacids of phosphorus and salts of said acids yielding an acidic hydrosol, permitting said hydrosol to set to a hydrogel, aging the hydrogel for a period of between about 1 and about 48 hours at a temperature within the approximate range of 120–212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter and drying the washed hydrogel.

6. An acidic catalyst consisting essentially of an oxygen-containing combination of aluminum, zirconium and phosphorus wherein the atomic ratio of aluminum to zirconium is about 1 to about 2 and in which the atomic ratio of the combined aluminum and zirconium content to phosphorus is between about 1 to about 1.5, prepared by reacting, in aqueous solution, a water-soluble salt of aluminum, a water-soluble salt of zirconium and a water-soluble compound selected from the group consisting of oxyacids of phosphorus and salts of said acids yielding an acidic hydrosol, permitting said hydrosol to set to a hydrogel, aging the hydrogel for a period of between about 1 and about 48 hours at a temperature within the approximate range of 120–212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter and drying the washed hydrogel.

7. A method for cracking a hydrocarbon charge which comprises contacting the same under catalytic cracking conditions with a catalyst consisting essentially of an oxygen-containing combination of aluminum, zirconium and phosphorus wherein the atomic ratio of aluminum to zirconium is between about 0.1 and about 10 and in which the atomic ratio of the combined aluminum and zirconium content to phosphorus is between about 0.1 and about 10, said catalyst resulting from reaction, in aqueous solution, of a water-soluble salt of aluminum, a water-soluble salt of zirconium and a water-soluble compound selected from the group consisting of oxyacids of phosphorus and salts of said acids yielding an acidic hydrosol, permitting said hydrosol to set to a hydrogel, aging the hydrogel for a period of between about 1 and about 48 hours at a temperature within the approximate range of 120–212° F. in an aqueous solution of a salt of an acid having a dissociation constant of less than about $1.7 \times 10^{-2}$, which salt is selected from the group consisting of those of ammonium and alkali metal salts, washing the hydrogel free of water-soluble matter and drying the washed hydrogel.

References Cited in the file of this patent

UNITED STATES PATENTS

| | | |
|---|---|---|
| 2,349,243 | Bates | May 23, 1944 |
| 2,349,827 | Mattox | May 30, 1944 |
| 2,611,738 | Webb et al. | Sept. 23, 1952 |

UNITED STATES PATENT OFFICE
CERTIFICATE OF CORRECTION

Patent No. 3,130,147 April 21, 1964

Francis G. Dwyer et al.

It is hereby certified that error appears in the above numbered patent requiring correction and that the said Letters Patent should read as corrected below.

Column 2, line 12, for "V through VII" read -- V through VIII --; column 2, line 22, for "any" read -- an --.

Signed and sealed this 8th day of December 1964.

(SEAL)
Attest:

ERNEST W. SWIDER
Attesting Officer

EDWARD J. BRENNER
Commissioner of Patents